United States Patent
Lapidus et al.

(10) Patent No.: US 7,062,598 B1
(45) Date of Patent: Jun. 13, 2006

(54) BYPASS CUSTOM ARRAY AND RELATED METHOD FOR IMPLEMENTING ROM FIXES IN A DATA PROCESSOR

(75) Inventors: Peter D. Lapidus, Boulder, CO (US); David H. Larsen, Boulder, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 307 days.

(21) Appl. No.: 10/425,573

(22) Filed: Apr. 29, 2003

(51) Int. Cl.
*G06F 12/00* (2006.01)
(52) U.S. Cl. ..................... 711/102; 714/710
(58) Field of Classification Search ............... 711/102; 365/94; 714/6, 710; 717/168
See application file for complete search history.

(56) References Cited

U.S. PATENT DOCUMENTS

| | | | | |
|---|---|---|---|---|
| 5,592,613 A | * | 1/1997 | Miyazawa et al. ............ | 714/6 |
| 5,796,974 A | * | 8/1998 | Goddard et al. ............ | 712/211 |
| 6,438,664 B1 | * | 8/2002 | McGrath et al. ............ | 711/154 |
| 2003/0097618 A1 | * | 5/2003 | Kim et al. .................... | 714/39 |
| 2004/0128471 A1 | * | 7/2004 | Oakley et al. ............... | 711/220 |
| 2004/0163080 A1 | * | 8/2004 | Menon et al. ............... | 717/168 |
| 2004/0205318 A1 | * | 10/2004 | Kimelman et al. ......... | 711/202 |

* cited by examiner

*Primary Examiner*—Nasser Moazzami

(57) ABSTRACT

A processing system comprising: i) a read-only memory (ROM) that stores original ROM code; ii) a custom array that stores replacement ROM code; and iii) control logic that receives an incoming ROM address and a read request signal generated by a source device. The control logic, in response to receipt of the incoming ROM address and the read request signal, compares the incoming ROM address to a patched address associated with the ROM. If a match occurs, the control logic outputs to the custom array a translated address associated with the patched address. The custom array then outputs a first line of replacement ROM code associated with the translated address.

3 Claims, 3 Drawing Sheets

BYPASS CUSTOM ARRAY AND RELATED METHOD FOR IMPLEMENTING ROM FIXES IN A DATA PROCESSOR

TECHNICAL FIELD OF THE INVENTION

The present invention is generally directed to data processors and, in particular, to a data processor that uses a bypass custom array to implement patches to a read-only memory (ROM).

BACKGROUND OF THE INVENTION

In recent years, there have been great advancements in the speed, power, and complexity of integrated circuits, such as application specific integrated circuit (ASIC) chips, random access memory (RAM) chips, microprocessor (uP) chips, and the like. These advancements have made possible the development of system-on-a-chip (SOC) devices. An SOC device integrates into a single chip many of the components of a complex electronic system, such as a wireless receiver (i.e., cell phone, a television receiver, and the like). SOC devices greatly reduce the size, cost, and power consumption of the system.

SOC data processors are characterized by a very high degree of integration on a single integrated circuit (IC) chip. Many of the peripheral components now integrated onto the same IC chip as a processor core would have been implemented as separate IC chips in a previous generation of processors. Advantageously, this decreases the amount of board space required, reduces the effects of noise, allows for low-voltage operations, and, in many cases, reduces the pin count of the SOC device.

Most data processors use one or more read-only memory (ROM) circuits to store data and instructions. Quite often, the ROMs circuits are implemented on the processor as a custom ROM design. The benefits to a custom ROM design are reduced area, speed, and the ability to make changes to the ROM. However, custom ROM has significant disadvantages, including the time required to implement the custom ROM.

An alternative to using a custom ROM is to use a synthesized ROM. Synthesized ROMs are easier to implement and allow for a faster time to market. However, a synthesized ROM also has significant disadvantages. It is very difficult to fix an error (or bug) in the code stored in a synthesized ROM after tape out without re-synthesizing and re-fabricating the synthesized ROM. This is an extremely expensive process.

Therefore, there is a need in the art for improved data processor and other large-scale integrated circuits that contain read-only memory (ROM) circuits. In particular, there is a need for improved ROM circuits in which ROM code errors may be patched easily and without re-synthesizing the entire ROM circuit.

SUMMARY OF THE INVENTION

To address the above-discussed deficiencies of the prior art, it is a primary object of the present invention to provide a processing system comprising: i) a read-only memory (ROM) capable of storing original ROM code; ii) a custom array capable of storing replacement ROM code; and iii) control logic capable of receiving an incoming ROM address and a read request signal generated by a source device, wherein the control logic, in response to receipt of the incoming ROM address and the read request signal, compares the incoming ROM address to a patched address associated with the ROM.

According to one embodiment of the present invention, the control logic, in response to a determination that the incoming ROM address matches the patched address, outputs to the custom array a translated address associated with the patched address.

According to another embodiment of the present invention, the custom array, in response to receipt of the translated address, outputs first replacement ROM code associated with the translated address.

According to still another embodiment of the present invention, the control logic outputs the first replacement ROM code to the source device.

According to yet another embodiment of the present invention, the control logic, in response to a determination that the incoming ROM address does not match the patched address, outputs the incoming ROM address to the ROM.

According to a further embodiment of the present invention, the ROM, in response to receipt of the incoming ROM address, outputs first original ROM code associated with the incoming ROM address and the control logic outputs the first original ROM code to the source device.

According to a still further embodiment of the present invention, the custom array comprises a random access memory (RAM).

According to a yet further embodiment of the present invention, the custom array comprises a register file.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
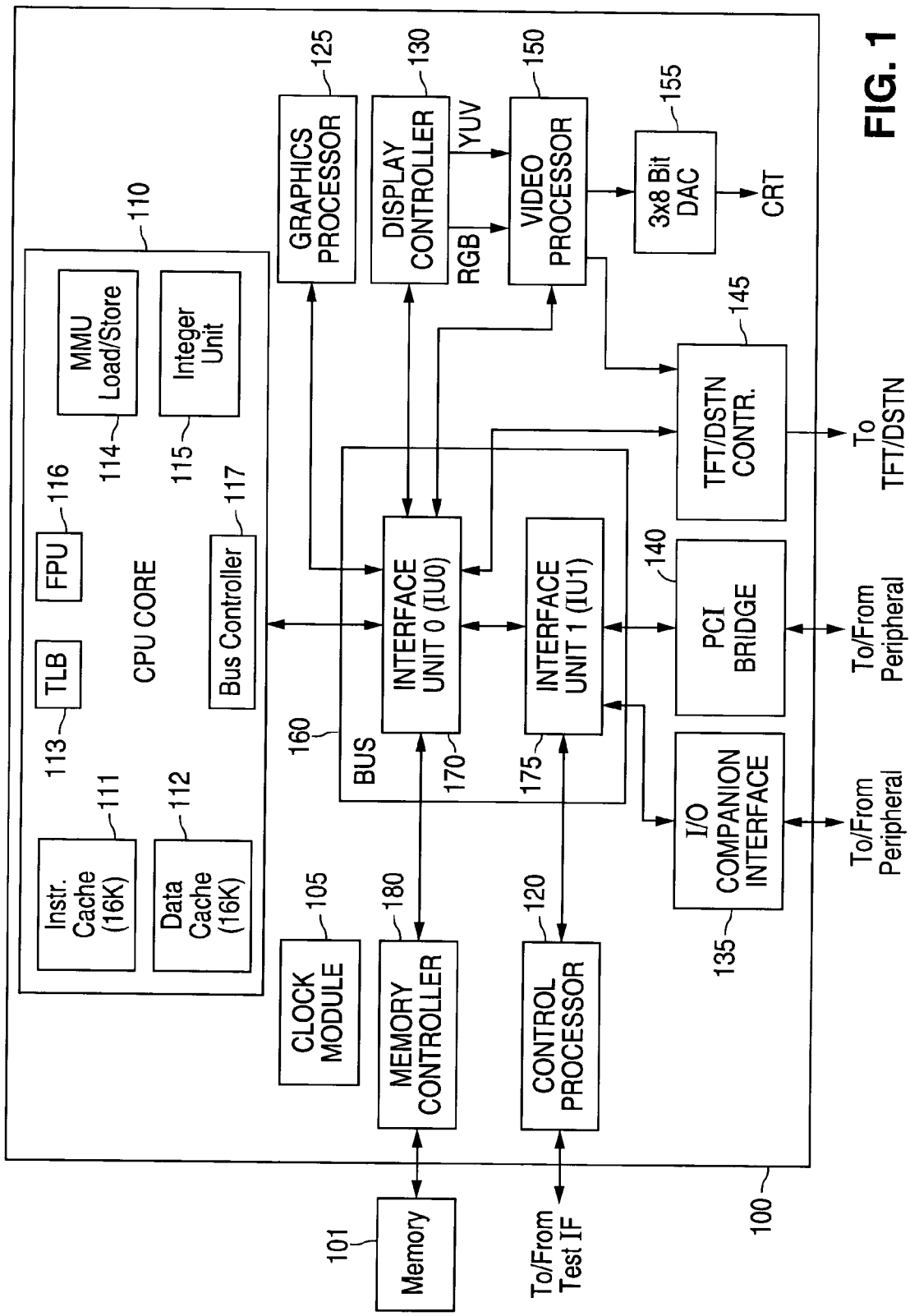
FIG. 1 illustrates an exemplary processing system according to one embodiment of the present invention.
Figure 2:
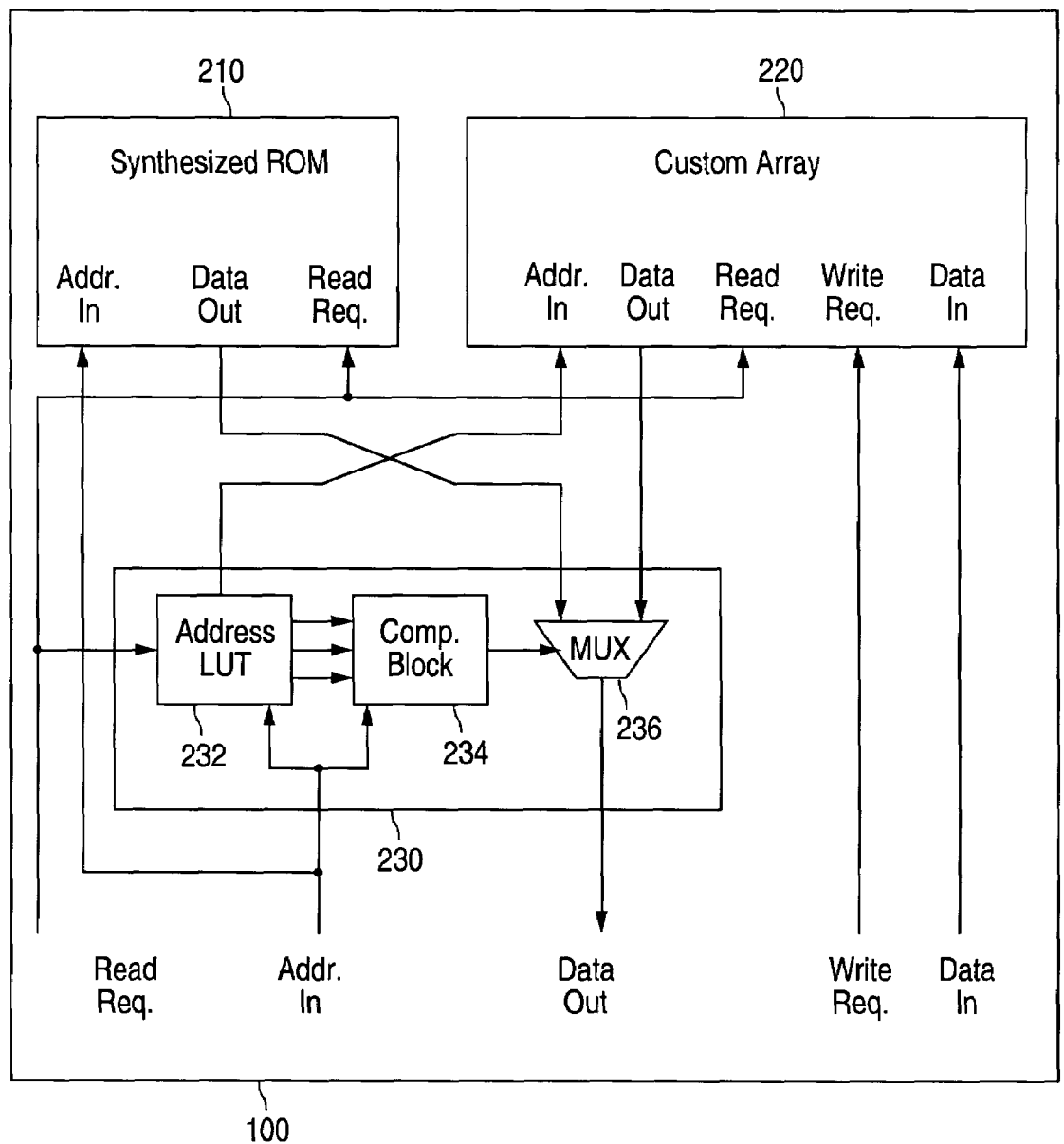
FIG. 2 illustrates a bypass custom array for implementing patches to a read-only memory (ROM) according to an exemplary embodiment of the present invention.
Figure 3:
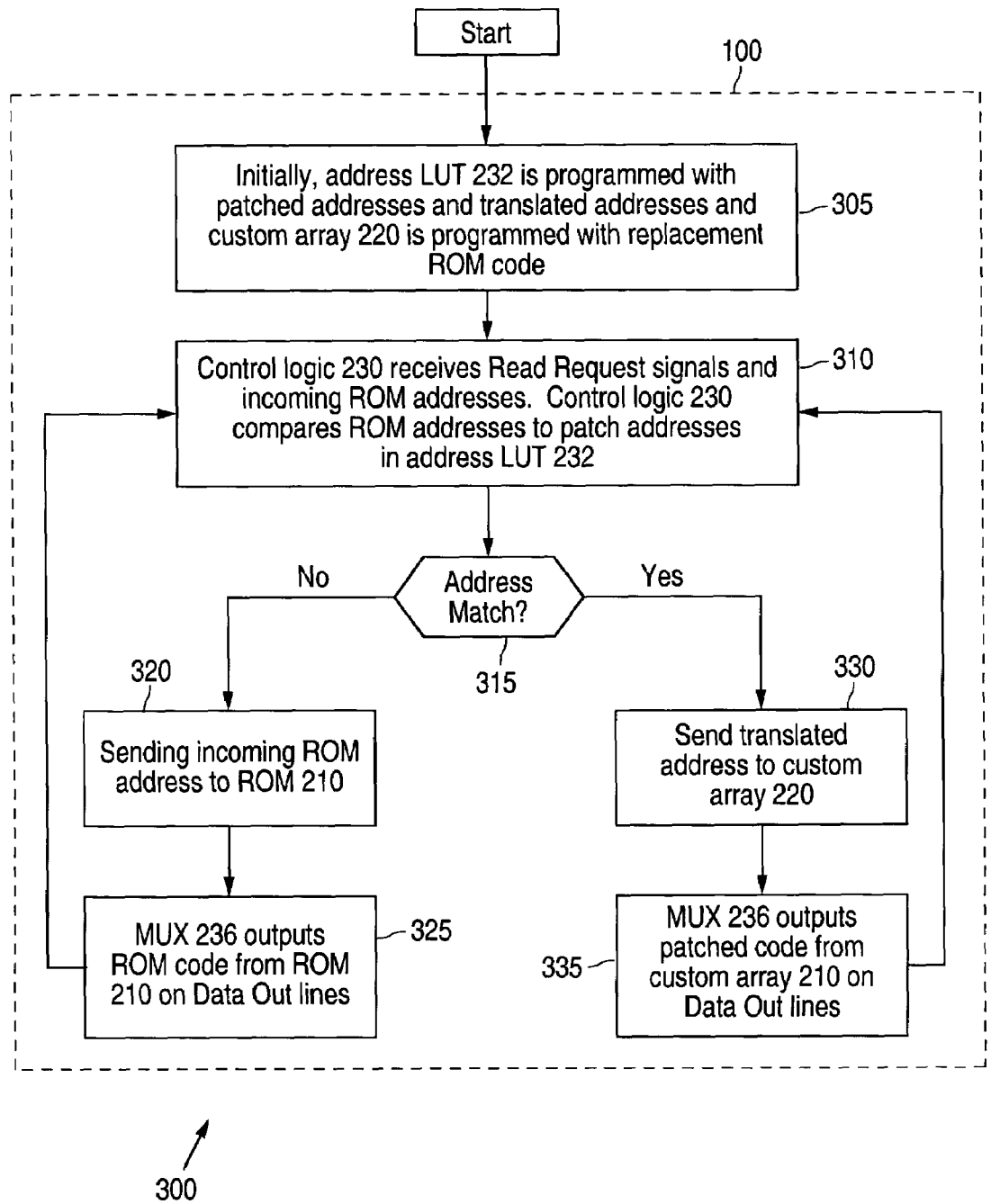
FIG. 3 is a flow chart illustrating the operation of the bypass custom array according to an exemplary embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor or other integrated circuit that contains a read-only memory (ROM).

FIG. 1 illustrates exemplary processing system 100 according to one embodiment of the present invention. In the exemplary embodiment, processing system 100 is a highly integrated system-on-a-chip (SOC) device designed to power information appliances (IA) for entertainment, educational, and/or business purposes. However, this is by way of illustration only and those skilled in the art will recognize that the present invention may be integrated into other types of SOC devices, such as cell phone transceivers, television receivers, radio receivers, and the like.

Processing system 100 comprises clock module 105, central processing unit (CPU) core 110, control processor 120, graphics processor 125, display controller 130, input/output (I/O) companion interface (IF) 135, peripheral component interconnect (PCI) bridge 140, TFT/DSTN controller 145, video processor 150, 3×8 bit digital to analog converter (DAC) 155, internal bus 160, and memory controller 180.

CPU core 110 comprises instruction cache 111, data cache 112, translation look-aside buffer (TLB) 113, memory management unit (MMU) load/store block 114, integer unit (IU) 115, floating point unit (FPU) 116, and bus controller 117. According to an exemplary embodiment of the present invention, instruction cache 111 is 16 kilobytes and data cache 112 is 16 kilobytes. Internal bus 160 comprises interface unit 0 (IU0) 170 and interface unit 1 (IU1) 175.

According to an exemplary embodiment of the present invention, CPU core 110 is an x86 compatible device and FPU 116 is an x87 compatible device. The instruction set supported by CPU core 110 may be a combination of the instruction sets implemented by the Intel Pentium™ processor, the AMD™ K6 and K7 processors, and the National Semiconductor Corporation™ (NSC) Gx1 processor.

Integer unit 115 comprises an instruction pipeline and associated logic. According to an exemplary embodiment, IU 115 consists of a single-issue eight-stage pipeline. The eight stages of the instruction pipeline in IU 115 are:

1) Instruction Pre-fetch stage;
2) Instruction Pre-decode stage;
3) Instruction Decode stage;
4) Instruction Queue stage;
5) Address Calculation 1 stage;
6) Address Calculation 2 stage;
7) Execution Unit stage; and
8) Writeback stage.

In the Instruction Pre-fetch stage, the raw instruction is fetched from the instruction memory cache. The Instruction Pre-decode stage extracts prefix bytes from the raw instruction bits. The pre-decode operation looks-ahead to the next instruction and a potential bubble can be eliminated if the pipeline stalls downstream. The Instruction Decode stage performs full decode of the instruction data and indicates the instruction length back to the Pre-fetch stage, thereby allowing the Pre-fetch stage to shift the appropriate number of bytes to the beginning of the next instruction.

The Instruction Queue stage comprises a FIFO containing decoded x86 instructions. The Instruction Queue allows the Instruction Decode stage to proceed even if the pipeline is stalled downstream. Register read operations for data oper- and address calculations are performed in the Instruction Queue stage. The Address Calculation 1 stage computes the linear address of operand data (if required) and issues requests to data cache 112. Microcode can take over the pipeline and inject a micro-box if multi-box instructions require additional data operands. In Address Calculation 2 stage, operand data (if required) is returned and set up to the Execution Unit stage with no bubbles if there was a data cache hit. Segment limit checking also is performed on the data operand address. The micro-read-only-memory (µROM) is read for setup to Execution Unit stage.

In the Execution Unit stage, register and/or data memory fetches are fed through the Arithmetic Logic Unit (ALU) for arithmetic or logical operations. The µROM always fires for the first instruction box into the pipeline. Microcode may control the pipeline and insert additional boxes in the Execution Unit stage if the instruction requires multiple Execution Unit stages to complete. The Writeback stage writes results of the Execution Unit stages to the register file or to data memory.

The memory subsystem of CPU core 110 supplies IU 115 pipeline with instructions, data, and translated addresses. To support efficient delivery of instructions, the memory subsystem uses instruction cache 111 and TLB 113. According to an exemplary embodiment of the present invention instruction cache 111 may be a single clock access, 16 KB, 4-way set associative cache and TLB 113 may be an 8-entry, fully associative, translation look-aside buffer for data and an 8-entry, fully associative, translation look-aside buffer for instructions. TLB 113 performs necessary address translations when in protected mode.

TLB 113 may also comprise a second-level (L2) unified (instruction and data), 64-entry, 2-way set associative TLB that is accessed when there is a miss to the instruction TLB or the data TLB. The L2 unified TLB takes an additional clock to access. When there is a miss to the instruction or data caches or the TLB, the access must go to memory controller 180 for processing. The use of instruction cache 111, data cache 112 and their associated TLB in TLB 113 improves the overall efficiency of integer unit 115 by enabling simultaneous access to both instruction cache 111 and data cache 112.

Floating-point unit (FPU) 116 is a pipelined arithmetic unit that performs floating-point operations in accordance with the IEEE 754 standard. FPU 116 is a pipelined machine with dynamic scheduling of instructions to minimize stalls due to data dependencies. FPU 116 performs out-of-order execution and register renaming. FPU 116 is designed to support an instruction issue rate of one instruction per clock from the integer core. The data path is optimized for single precision arithmetic. Extended precision instructions are handled in microcode and require multiple passes through the pipeline. According to an exemplary embodiment, FPU 116 comprises an execution pipeline and a load/store pipeline, thereby enabling load/store operations to execute in parallel with arithmetic instructions.

Control processor 120 is responsible for reset control, macro-clock management, and debug support provided in processing system 100. Control processor 120 comprises a JTAG interface and the scan chain control logic. Control processor 120 supports chip reset, which includes initial phase-locked loop (PLL) control and programming, and runtime power management macro-clock control. The JTAG support includes a TAP controller that is IEEE 1149.1 compliant. CPU control can be obtained through the JTAG interface into the TAP Controller, and all internal registers, including CPU core 110 registers, may be accessed. In-circuit emulation (ICE) capabilities are supported through the JTAG and TAP Controller interface.

As noted above, internal bus 160 comprises two interface units: IU0 170 and IU1 175. IU0 170 connects six high-speed modules together with a seventh link to IU1 175. IU1 175 connects to three low-speed modules, namely I/O companion IF 135, PCI bridge 140, and TFT/DSTN controller 145.

Memory controller 180 is the source for all access to memory 101 in processing system 100. Memory controller 180 supports a memory data bus width of sixty-four (64) bits. Memory controller 180 supports two types of memory 101. The first type of memory 101 is a 111 MHz 222 MT/S for DDR (Dual Data Rate). The second type of memory 101 is a 133 MHz for SDR (Single Data Rate). Memory controller 180 supports up to one gigabyte (1 GB) of either SDR memory 101 or DDR memory 101.

The modules that need access to memory 101 are CPU core 110, graphics processor 125, display controller 130, and TFT/DSTN controller 145. Because memory controller 180 supports memory needs for both CPU core 110 and the display subsystem, memory controller 180 is classically referred to as a Unified Memory Architecture (UMA) memory subsystem. According to an exemplary embodiment of the present invention, graphics processor 125 is a BitBLT/vector engine that supports pattern generation, source expansion, pattern/source transparency, and 256 ternary raster operations.

Display controller 130 performs the following functions: 1) retrieval of graphics, video, and overlay streams from the frame buffer; 2) serialization of the streams; 3) any necessary color look-ups and output formatting; and 4) interfacing with the display filter for driving the display device(s) (not shown). Display controller 130 may comprise a graphical user interface (GUI) and a VGA, which provides full hardware compatibility with the VGA graphics standard. The VGA passes 8-bit pixels and sync signals to the GUI, which expands the pixels to 24 BPP via the color lookup table and passes the information to video processor 150. Video processor 150 ultimately generates the digital red, green, and blue signals and buffers the sync signals, which are then sent to DAC 155 or the flat panel interface.

Video processor 150 mixes the graphics and video streams, and outputs digital RGB data to DAC 155 or the flat panel interface, depending upon the part (i.e., cathode ray tube (CRT) or flat panel (FP)). Video processor 150 is capable of delivering high resolution and true color graphics. Video processor 150 may also overlay or blend a scaled true color video image on the graphics background.

TFT/DSTN controller 145 converts the digital RGB output of a video mixer block to the digital output suitable for driving a dual-scan color STN (DSTN) flat panel LCD. TFT/DSTN controller 145 connects to the digital RGB output of video processor 150 and drives the graphics data onto a dual-scan flat panel LCD. According to an exemplary embodiment, TFT/DSTN controller 145 may drive all standard dual-scan color STN flat panels up to 1024×768 resolution.

PCI bridge 140 contains all the necessary logic to support a standard external PCI interface. The PCI interface is PCI 2.2 specification compliant. PCI bridge 140 comprises the PCI and Interface Unit control, read and write FIFOs, and a PCI arbiter. I/O companion IF 135 handles several unique signals that support system reset, system interrupts, and power system managements.

According to the principles of the present invention, processing system 100 comprises one or more read-only memory (ROM) circuits that store instructions and/or data. These ROM circuits may be implemented, for example, in CPU core 110, PCI bridge 140, memory controller 180, and the like. From time to time, it may be necessary to correct (or patch) an error that is found in these ROM circuits. This is particularly true during the design phase.

The present invention provides an apparatus and method for patching any of the ROM circuits in processing system 100. The present invention comprises a bypass custom array circuit and related ROM control logic that patches selected addresses in a conventional synthesized ROM circuit in processing system 100. The custom array may comprise a small random access memory (RAM) circuit, a small register file, or a similar small storage device. When an address and a read request are received by the ROM control logic, the ROM control logic compares the received address with a list of patched address. If no match occurs, the received address is transferred to the conventional synthesized ROM circuit in order to retrieve the targeted ROM code. However, if a match occurs, the received address is translated into a patch address in the custom array. The corrected (or patched) ROM code is then retrieved from the custom array circuit, instead. In this manner, the custom array circuit bypasses the conventional synthesized ROM circuit.

FIG. 2 illustrates bypass custom array 220 for implementing patches to conventional synthesized read-only memory (ROM) 210 in processing system 100 according to an exemplary embodiment of the present invention. Read-only memory (ROM) control logic 230 comprises address lookup table (LUT) 232, comparator block 234, and multiplexer (MUX) 236. Custom array 220 stores replacement (or patch) code (data and/or instructions) that replaces corresponding erroneous code in synthesized ROM 210. Since custom array 220 is generally much smaller that synthesized ROM 210, addresses in synthesized ROM 210 must be translated to addresses in custom array 220. Address LUT 232 contains a list of patched addresses in synthesized ROM 210 and the corresponding translated addresses in custom array 220.

All addresses to synthesized ROM 210 are supplied to ROM control logic 230. The Data Out buses of synthesized ROM 210 and custom array 220 are applied to multiplexer (MUX) 236. During a ROM read operation, a Read Request signal and an incoming address (Address In) are applied to synthesized ROM 210, to custom array 220 and to ROM control logic 230. ROM control logic 230 detects a read operation to a patched address in synthesized ROM 210 and returns the corrected data from custom array 220 instead by controlling MUX 236. ROM control logic 230 also detects a read operation to an unpatched address in synthesized ROM 210 and returns the ROM code from synthesized ROM 210 by controlling MUX 236.

Comparator block 234 comprises a block of comparators that compare each of the patched addresses in address LUT 232 with the incoming address received by control logic 230. If a match occurs, comparator block 234 generates a HIT signal. The HIT signal causes address LUT 232 to output the translated address to the Address In inputs of custom array 220. The HIT signal also causes MUX 236 to select the Data Out output of custom array 220. Thus, when the HIT signal is enabled, the replacement code from custom array 220 is output as Data Out by control logic 230 back to the source that issued the Read Request to synthesized ROM 210.

FIG. 3 depicts flow chart 300, which illustrates the operation of the bypass custom array according to an exemplary embodiment of the present invention. Initially, after a power reset or other enable signal, address LUT 232 is programmed with patched addresses and translated addresses and custom array 220 is programmed with replacement ROM code (process step 305). Address LUT 232 may be programmed by CPU core 110 or another element of processing system 100 by any conventional means. The exact means by which address LUT 232 is programmed is not essential to the operation of the present invention.

Once address LUT 232 is programmed, address LUT 232 may be used to program custom array 220. This may be done by applying a patched address to address LUT 232, so that a translated address is applied to custom array 220, and then using the Write Request signal and the Data In input bus to write replacement ROM code into custom array 220 at the location of the translated address. This procedure is repeated for all patched addresses in synthesized ROM 210.

After address LUT 232 and custom array 220 are programmed, control logic 230 receives Read Request signals and incoming ROM addresses. In response, ROM control logic 230 compares each incoming (or received) ROM address to the patched addresses in address LUT 232 (process step 310). If an address match does not occur (process step 315), ROM control logic 230 sends the incoming ROM address to ROM 210 (process step 320). Then, MUX 236 outputs the original ROM code from ROM 210 on the Data Out lines from control logic 230 (process step 325).

However, if an address match does occur (process step 315), ROM control logic 230 sends a translated address to custom array 220 (process step 330). Then MUX 236 outputs the patched code from custom array 210 on the Data Out lines from control logic 230 (process step 335).

Although the present invention has been described with an exemplary embodiment, various changes and modifications may be suggested to one skilled in the art. It is intended that the present invention encompass such changes and modifications as fall within the scope of the appended claims.

What is claimed is:

1. A processing system comprising:
a read-only memory (ROM) to store original ROM code;
a data array to store replacement ROM code;
and control logic to receive an incoming ROM address and a read request signal generated by a source device;
wherein said control logic, in response to receipt of said incoming ROM address and said read request signal, compares said incoming ROM address to a patched address associated with said ROM;
wherein said control logic, in response to a determination that said incoming ROM address matches said patched address, outputs to said data array a translated address associated with said patched address;
wherein said data array, in response to receipt of said translated address, outputs first replacement ROM code associated with said translated address;
wherein said control logic outputs said first replacement ROM code to said source device; and
wherein said first replacement ROM code includes ROM code identified by said read request signal.

2. An integrated circuit comprising:
a processor core;
a plurality of peripheral devices;
a read-only memory (ROM) to store original ROM code;
a data array to store replacement ROM code; and
control logic to:
receive an incoming ROM address and a read request signal generated by a source device, wherein said control logic, in response to receipt of said incoming ROM address and said read request signal, compares said incoming ROM address to a patched address associated with said ROM; and
in response to a determination that said incoming ROM address matches said patched address, outputs to said data array a translated address associated with said patched address;
wherein said data array in response to receipt of said translated address outputs first replacement ROM code associated with said translated address; and
wherein said first replacement ROM code includes ROM code identified by said read request signal.

3. For use in processing system comprising a read-only memory (ROM) to store original ROM code, and a data array to store replacement ROM code, a method of handling ROM read requests received from a source device, the method comprising:
receiving an incoming ROM address and a read request signal generated by the source device;
in response to receipt of the incoming ROM address and the read request signal, comparing the incoming ROM address to a patched address associated with the ROM;
in response to a determination that the incoming ROM address matches the patched address outputting to the data array a translated address associated with the patched address; and
in response to receipt of the translated address, outputting from the data array first replacement ROM code associated with the translated address, wherein said first replacement ROM code includes ROM code identified by said read request signal.

* * * * *